United States Patent [19]
Hilliard

[11] 4,422,658
[45] Dec. 27, 1983

[54] WHEELED CARRIER

[75] Inventor: Steven F. Hilliard, Odenton, Md.

[73] Assignee: Roger C. Lam, Columbia, Md.; a part interest

[21] Appl. No.: 306,227

[22] Filed: Sep. 28, 1981

[51] Int. Cl.³ ............................................. B62B 9/10
[52] U.S. Cl. ................................... 280/47.4; 280/642; 297/64; 297/467
[58] Field of Search ............... 297/64, 148, 355, 467; 280/87.02 W, 47.38, 47.4, 47.41, 642, 643

[56] References Cited

U.S. PATENT DOCUMENTS

| | | | |
|---|---|---|---|
| D. 183,651 | 10/1958 | Gill | D14/14 |
| 865,541 | 9/1907 | Storm . | |
| 1,765,786 | 6/1930 | Brown . | |
| 1,917,557 | 7/1933 | Steiger . | |
| 2,362,186 | 11/1944 | Brantz | 280/639 |
| 2,362,721 | 11/1944 | Reynolds | 5/82 |
| 2,714,417 | 8/1955 | Golding | 297/467 X |
| 2,781,225 | 2/1957 | Heideman | 280/47.4 X |
| 2,783,053 | 2/1957 | Sheldrick et al. | 280/47.4 X |
| 2,851,084 | 9/1958 | Benjetsky | 297/467 X |
| 3,185,521 | 5/1965 | Waldo | 297/467 X |
| 3,443,823 | 5/1969 | Perego | 280/639 |
| 3,540,774 | 11/1970 | Bailey | 297/148 X |
| 3,761,126 | 9/1973 | Mulholland | 297/467 |
| 3,762,768 | 10/1973 | Hyde et al. | 297/467 X |
| 3,784,252 | 1/1974 | Peterson | 297/355 X |
| 3,887,228 | 6/1975 | Ingerson | 297/39 |
| 3,930,662 | 1/1976 | Manner | 280/639 |
| 4,032,173 | 6/1977 | Clegg | 280/650 |
| 4,042,250 | 8/1977 | Rodaway | 280/42 |
| 4,101,143 | 7/1978 | Sieber | 280/42 |
| 4,157,839 | 6/1979 | Lahti et al. | 280/642 |

Primary Examiner—Joseph F. Peters, Jr.
Assistant Examiner—Michael Mar
Attorney, Agent, or Firm—Morton J. Rosenberg

[57] ABSTRACT

A wheeled carrier (10) which includes a substantially planar back frame (20) and a substantially planar base frame (34) which is rotationally coupled to the back frame (20). The base frame (34) extends in a substantially horizontal plane and the back frame (20) may be rotationally displaced from a substantially vertical plane to a substantially horizontal plane. The wheeled carrier (10) further includes a plurality of wheel members (54, 54', 56, 56') which are rotatably coupled to the base frame (34) for rolling the wheeled carrier (10) on a base surface (12). A containment mechanism (62) is provided and is releasably coupled to the back frame (20) and the base frame (34) for preventing a user from falling external to the wheeled carrier (10). The containment mechanism (62) is vertically adjustable with respect to the base frame (34) and the back frame (20) and is also removable from the back and base frames (20 and 34) in order that the back frame (20) may be rotated to a substantially horizontal plane in order to permit a user to lie on the wheeled carrier (10).

13 Claims, 8 Drawing Figures

WHEELED CARRIER

BACKGROUND OF THE INVENTION

1. Field of the Invention

This invention pertains to wheeled carrier systems. In particular, this invention is directed to an orthopedic chair which is used for children who must remain in the carrier for prolonged periods of time. Additionally, this invention relates to wheeled carriers that may be used by the user in a sitting or standing position. Further, this invention relates to wheeled carriers that may be used both as a stroller as well as a bed-like system. Further, this invention pertains to wheeled carriers which include a containment mechanism releasably coupled to both a back frame and a base frame for preventing the user from falling external to the wheeled carrier. More in particular, this invention pertains to a wheeled carrier wherein the containment mechanism is vertically adjustable with respect to the base and back frames and is insertable and removable from the overall wheeled carrier system. More in particular, this invention relates to a wheeled carrier which includes a tray member coupled to the containment mechanism to provide both a platform upon which the user may work. Further, this invention pertains to a wheeled carrier which allows the tray member to be lockingly engaged with the containment mechanism in a predetermined positional relation, and to be releasable therefrom when the tray member is not in use.

2. Prior Art

Wheeled carrier systems used as strollers are well-known in the art. The best prior art known to the Applicant includes U.S. Pat. Nos. 4,042,250; 3,930,622; 3,887,228; 2,362,186; 4,032,173; D183,651; 3,443,823; 865,541; 4,157,839; 1,917,557; 4,101,143; 1,765,786; and, 2,362,721.

In some prior art systems, such as U.S. Pat. No. 4,042,250, there is a wide type seat and back rest construction. However, such does not direct itself to the adjustability of the constrainment mechanism, as is provided in the subject invention concept.

Additionally, other prior art systems such as that shown in U.S. Pat. No. 3,930,662, direct themselves to a wheeled carrier which includes portions of a frame which has fabric material, much in the manner of lawn chairs. However, such prior art systems do not provide for the foldability or adjustability of the containment mechanism, as is provided in the subject invention concept.

Other types of carriers do provide for tray mechanisms mounted on such prior art carriers, however, such do not provide for the locking engagement type mechanism, as is provided in the subject invention concept.

SUMMARY OF THE INVENTION

A wheeled carrier which includes a substantially planar back frame extending in a substantially vertical plane having a pair of transversely displaced back post members. The wheeled carrier also has a substantially planar base frame coupled to the back frame which extends in a substantially horizontal plane. A plurality of wheel members are rotatably coupled to the base frame for rolling the wheeled carrier on a base surface. Additionally, there is included a containment mechanism which is releasably coupled to the back frame and the base frame for preventing a user from falling external to the wheeled carrier. The containment mechanism is both vertically adjustable with respect to the base and back frames, and is removable from the back and base frames.

DESCRIPTION OF THE PREFERRED EMBODIMENTS

Figure 1:
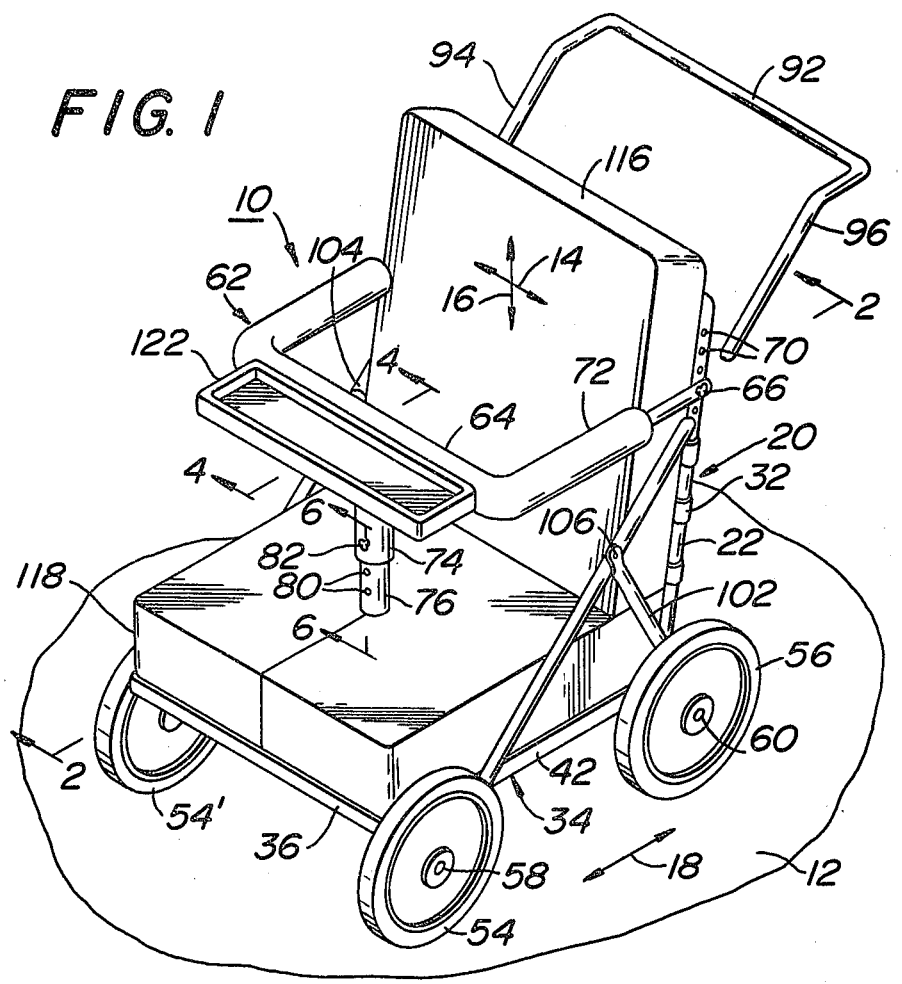
FIG. 1 is a perspective view of the wheeled carrier.
Figure 2:
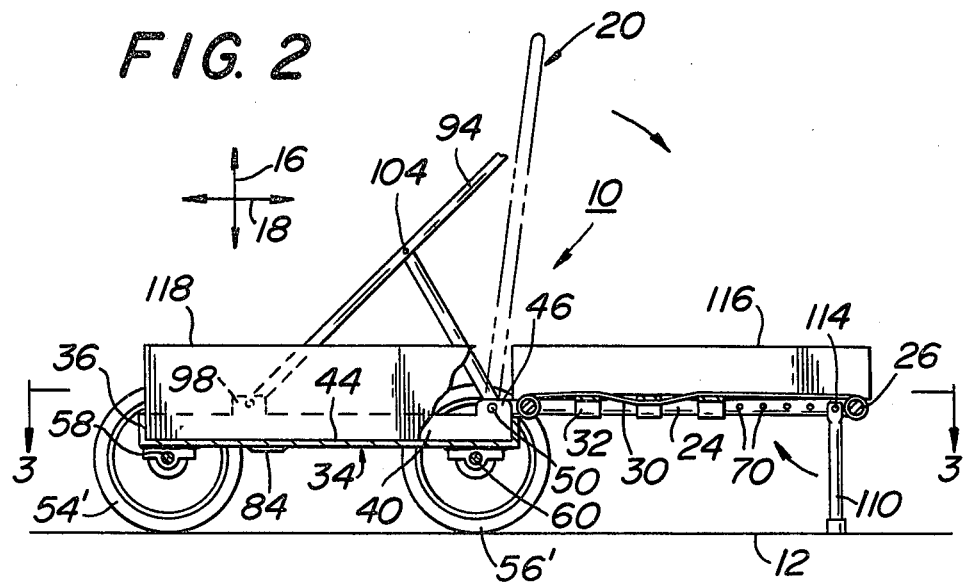
FIG. 2 is an elevational view of the wheeled carrier, showing the wheeled carrier in a horizontal positional placement.
Figure 3:
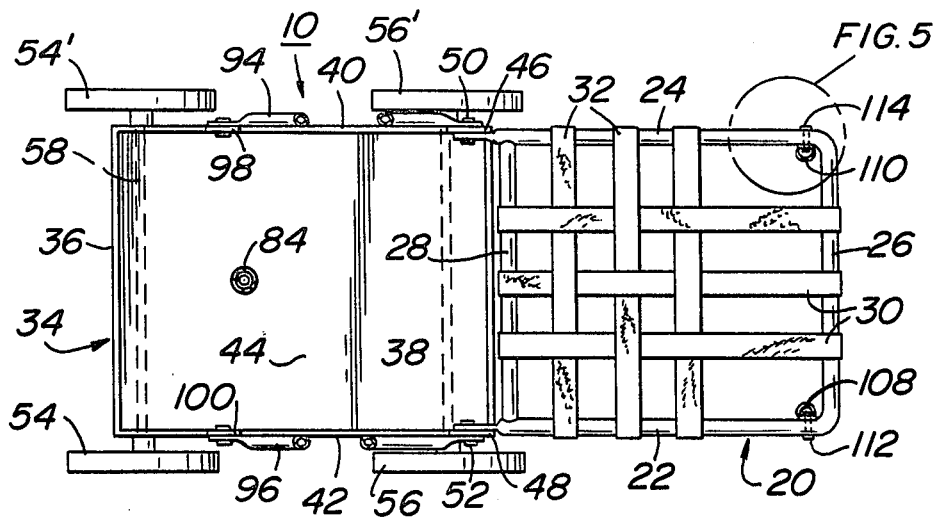
FIG. 3 is a sectional view of the wheeled carrier taken along the section lines 3—3 of FIG. 2.
Figure 5:
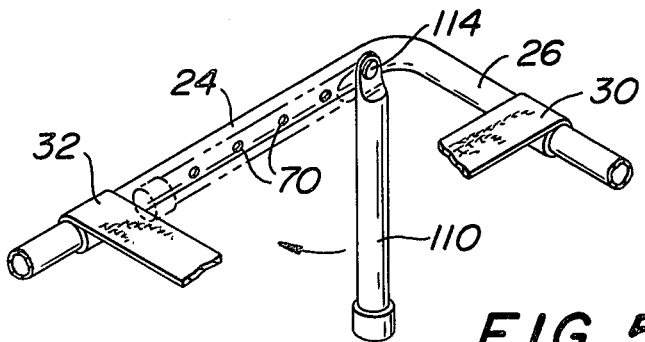
FIG. 5 is a perspective view partially cut-away of the handle section of the wheeled carrier, showing support rod members adapted to interface with the base surface.

Referring now to FIGS. 1–3, there is shown wheeled carrier or orthopedic chain 10 to be used for a multiplicity of purposes and objectives hereinafter to be described. Although not restricted to hospital use, wheeled carrier 10 has found particular advantages when used in pediatric sections of hospitals. Wheeled carrier 10 is formed of a lightweight construction material in order to be easily manipulatable. Additionally, orthopedic chair 10 may be used as a stroller, playpen, and a bed-like system, as is shown in the conversion concept of FIG. 2. Carrier 10 is mainly used for children and has been developed specifically for children that have a mobility problem resulting from cast elements being placed on the limbs and specifically, on the legs. Additionally, orthopedic chair 10 has been developed for children who are forced into a predetermined position and for those children undergoing medical therapy which forces the two legs to be placed in constrained relation each to the other. In this particular type of medical therapy, the children's legs are placed in casts and a bar or other rigid member joins the legs. Thus, wheeled carrier 10 is specifically directed to children who must remain in a somewhat standing position. For this reason, carrier 10 serves as both a stroller type system and also provides for a playpen type environment.

Additionally, since a child is generally active, and will remain in wheeled carrier 10 for prolonged periods of time, the overall contour allows for a wide bodied carrier 10 in transverse direction 14. In overall contour, the transverse width of wheeled carrier 10 may be between the approximate ranges of 20.0–30.0 inches. Additionally, the extended length in longitudinal direction 18 may also be within the approximate range of 20.0–30.0 inches, although such dimensions in longitudinal direction 18 are not important to the inventive concept, as is herein described. The overall concept of wheeled carrier or orthopedic chair 10 is associated with allowing the child to have mobility during his or her normal activities while simultaneously providing a safety feature to permit containment and constrainment of the child within the internal environs of carrier 10. Although not restricted to the use by children, wheeled carrier 10 has been used successfully for children between the years of 2.0–4.0.

Wheeled carrier 10 includes substantially planar back frame 20 which when carrier 10 is used as a stroller, extends in a substantially vertical plane defined by the intersection of the directional arrows 14 and 16. Back frame 20 may be rotated to a horizontal plane defined as being parallel to a plane defined by a planar base surface 12, as is shown in FIG. 2. Back frame 20 is formed of a pair of transversely displaced back post members 22 and 24, as is clearly seen in FIG. 3. Back post members 22 and 24 are joined each to the other by upper post member 26 and lower post member 28. Upper post member 26 and lower post member 28 may be joined to post members 24 and 28 in one-piece formation, or may be coupled thereto in rigid constrainment through bolts, screws, or some like technique. Additionally, post members 22, 24, 26, and 28 are formed of a lightweight aluminum, or other lightweight material type tubular members, in order to decrease the overall weight of wheeled carrier 10 to a minimum amount. The only restriction on the construction and materials used of post members 22, 24, 26, and 28, is that such has the structural integrity to accept the weight and dynamic loading associated with the normal movements of a child. The backing for back frame 12 is provided by vertical webbing members 30 and transverse webbing members 32, interwoven in an undulating fashion, as is clearly shown in FIG. 3. Webbing members 30 and 32 may be formed of a textile material, or of a plastic webbing construction having a width in the range of 1.0–4.0 inches. Interweaving of webbing members 30 and 32 provides additional structural integrity of back frame 20, while at the same time, allowing a flexible type backing which yields under the continual movement of a user. The concept of flexibility is important in the overall concept, since the user or child will be maintained in wheeled carrier 10 for prolonged periods of time.

Vertical webbing members 30 and transverse webbing members 32 may be joined to associated upper and lower post members 26 and 28 as well as transversely displaced back post members 22 and 24 through bolts, screws, or some like technique, not important to the inventive concept as is herein described. The overall construction of back frame 20 may be very similar to a lawn type chair commercially available.

Wheeled carrier 10 further includes substantially planar base frame 34 which is coupled to back frame 20 and extends in a substantially horizontal plane. Only for purposes of this description, the horizontal plane referred to is generally a plane which is parallel to base surface 12. It is understood that base surface 12 may not be a planar type contour, however, such is herein being described as planar in order to more definitively describe the various contours of wheeled carrier or orthopedic chair 10. Base frame 34 may include front and rear flange members 36 and 38. Additionally, there is provided transversely displaced flanges 40 and 42, as is shown in FIGS. 1–3. Flanges 36, 38, 40 and 42 are coupled to base frame bottom wall 44 in order to provide an overall box-like volumetric contour. Flanges 36, 38, 40, and 42 may be constructed in one-piece formation with base frame bottom wall 44 form the couple thereto through bolts, screws, or some like mechanism, not important to the overall concept as herein described. Additionally, base frame 34 may be formed of a lightweight wood, such as plywood, or may be formed in one-piece construction of a composition such as a lightweight plastic or other like material. Base frame 34 includes rear lug members 46 and 48. Lug members 46 and 48 extend upwardly in vertical direction 16 from respective flange members 40 and 42, as is shown in the Figures. Rear lug members 46 and 48 include pivot pins 50 and 52 which couple base frame 34 to transversely displaced back post members 24 and 22 of back frame 20. In this manner, back frame 20 may be rotationally activated or displaced with respect to base frame 34, as is shown in FIG. 2.

Wheeled carrier or orthopedic chair 10 further includes a pair of frontal wheel members 54 and 54', as well as rear wheel members 56 and 56'. Frontal and rear wheel members 54, 54', 56, and 56' are rotatably coupled to base frame 34 for rolling wheeled carrier 10 on base surface 12. Wheel members 54, 54', 56 and 56' are mounted on respective axles 58 and 60, and are attached through bolts, screws, or some like mechanism to base frame bottom wall 44. Wheel members 54, 54', 56 and 56' are standard wheel members commercially available formed of a lightweight aluminum or some like material being used as a hub and possibly a rubber external circumference member to allow ease of displacement of wheeled carrier 10 on base surface 12.

Referring now to FIGS. 1, 4, 6 and 8, there is shown containment mechanism 62 which is releasably coupled to back frame member 20 and base frame 34 for preventing a user or child from falling external to the wheeled carrier 10. Containment mechanism 62, as will be seen in following paragraphs, is both vertically adjustable with respect to base frame 34 and back frame 20, as well as being removable from base and back frames 34 and 20. As will be seen, adjustability in vertical direction 16 allows wheeled carrier or orthopedic chair 10 to be used as a chair when the user is sitting, as well as a playpen type system when the user is forced to stand for prolonged periods of time. Additionally, the vertical adjustability of containment mechanism 62 allows for growth of a child due to the fact that many children are forced to use wheeled carrier 10 over prolonged time intervals. Removability of containment mechanism 62 allows wheeled carrier 10 to be used as a sleeping pad or bed type system, as is seen from FIG. 2.

Figure 8:
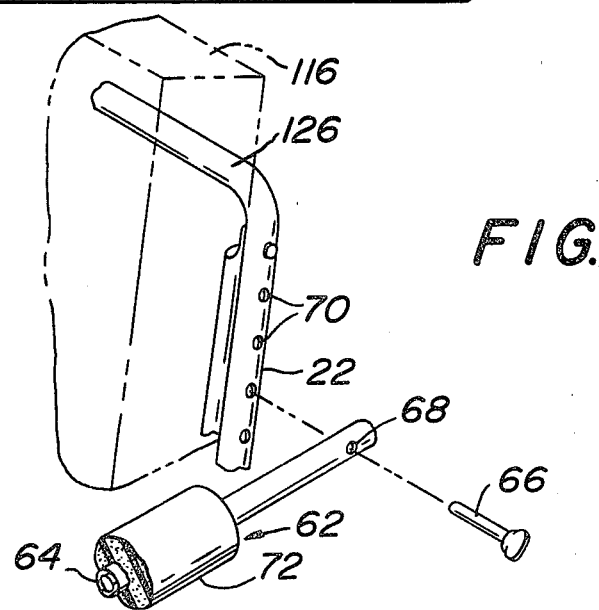
FIG. 8 is a perspective view of a portion of the containment mechanism showing an exploded view of the coupling of the containment mechanism to the back frame of the wheeled carrier.

Containment mechanism 62 includes substantially U-shaped containment bar member 64 which is releasably coupled to transversely displaced back post members 22 and 24 of back frame 20. Containment mechanism 62 includes mechanisms for vertically adjusting U-shaped containment bar member 64 at predetermined vertical displacements above base frame 34. As can be seen in FIG. 8, such vertical adjustment with respect to back post members 22 and 24 of back frame 20 is provided by second pin member 66 insertable completely through openings 68 into one of a plurality of vertically displaced post openings 70 formed within the pair of transversely displaced back post members 22 and 24 of back frame 20. Back post openings 70 are vertically displaced each with respect to the other and are generally spaced 1.0–2.0 inches apart on respective post members 22 and 24. The important consideration being that opposing back post openings 70 on respective post members 24 and 26 are aligned each with respect to the other in order that U-shaped containment bar member 64 is able to be maintained in a generally horizontal plane above base frame 34. Additionally, the diameter of openings 68 and 70 is not important to the inventive concept, with the exception that second pin member 66 is generally slidable therethrough and may be inserted completely through openings 68 into openings 70. Additionally, U-shaped containment bar member 64 includes padding member 72 extending substantially throughout the extended length of bar member 64. Obviously, padding 72 is used for protecting the user in the event that the user bangs his or her hand against bar member 64. Padding 72 may be formed of a resilient material such as foam rubber, or some like material composition. Bar member 64 may be formed of generally tubular aluminum or like material which is lightweight in density in order to provide the overall lightweight characteristics of wheeled carrier 10.

Figure 6:
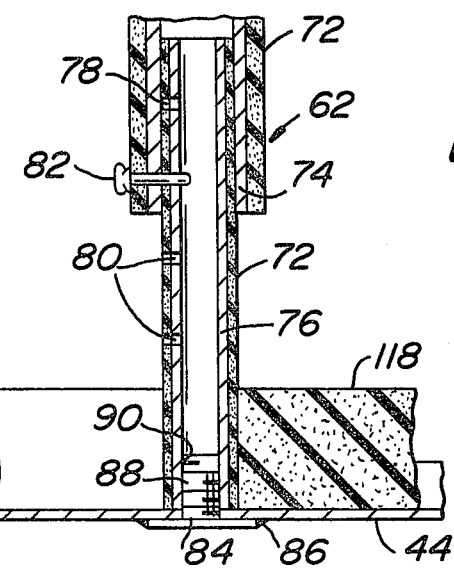
FIG. 6 is a sectional view of the containment mechanism partially cut-away and taken along the section lines 6—6 of FIG. 1.

Containment mechanism 62 further includes first bar member 74 which extends in substantially vertical direction 16 and is fixedly secured to U-shaped containment bar member 64. First bar member 74 extends in a downward direction and may be joined or coupled to U-shaped bar member 64 through bolts, screws, or some like mechanism, or even in the alternative, may be formed in one-piece formation with U-shaped containment bar member 64. As is seen in FIG. 6, first bar member 74 may be tubular in nature and includes an axial opening for purposes to be described in following paragraphs. Additionally, first bar member or tubular member 74 is also surrounded by padding member 72 which has been previously described.

Containment mechanism 62 further includes second bar member 76 which is releasably secured to base frame 34 and is slidably received within first bar member 74, as is clearly seen in FIG. 6. Second bar member 76 once again is tubular in construction and formed of a generally lightweight material, such as aluminum. Second bar member or second tubular member 76 is also surrounded with resilient padding 72, as has been previously described. First bar member 74 includes a plurality of openings 78 which are vertically displaced each from the other. Additionally, second bar or second tubular member 76 also includes a plurality of openings 80 which in themselves are vertically displaced each from the other and adapted to be aligned with openings 78 of first bar member 74. First pin member 82 is insertable through aligned openings 78 and 80 in respective first bar member 74 and second bar member 76, as is clearly shown in FIG. 6. In this manner, first bar member 74 and second bar member 76 may be adjusted in vertical direction 16 at some predetermined height above base frame bottom wall 44. Further, constrainment of U-shaped containment bar member 64 to wheeled carrier or orthopedic chair 10 is maintained through the combination of securement of first pin member 82 and second pin member 66 to respective elements, as has hereinbefore been described.

Removal and mounting of containment mechanism 62 to base frame 34 is provided by second bar member 76 being threadedly secured to base frame 34. As can be seen, bolt member 84 is rigidly secured to bottom wall 44 at weld point 86, or is otherwise secured to base frame bottom wall 44. Bolt member 84 has external thread 88 formed thereon and extends upwardly through bottom wall 44. Second bar member or second tubular member 76 has a cooperating internal thread 90, which is adapted for threaded securement to external thread 88 of bolt member 84. In this manner, second bar or tubular member 76 may be coupled in fixed securement to bottom wall 44 of base frame 34. When wheeled carrier 10 is to be used as a bed-like system, second bar member 76 may be unthreaded from bolt member 84 and the entire U-shaped containment bar member 64 removed from base frame 34.

Referring now to FIG. 1, there is seen handle member 92 passing in transverse direction 14 to be grasped by a person wheeling orthopedic chair 10. Handle member 92 has a width which is greater than the width of back frame 20 and base frame 34. A pair of transversely displaced handle rods 94 extend diagonally in a downward manner from handle member 92 and are coupled to front lug members 98 and 100, as is seen in FIG. 3. Coupling of handle rods 94 and 96 to front lug members 98 and 100 may be through a pivotal type coupling, or other like technique, not important to the inventive concept as is herein defined. Further, front lug members 98 and 100 are mounted to side flanges 40 and 42, respectively, in the same manner as rear lug members 46 and 48, as has been previously described.

Intermediate rods 102 and 104 extend from rear lug members 46 and 48 in a diagonally upward manner, as is clearly seen in FIG. 2. Coupling of intermediate rods 102 and 104 to rear lug members 46 and 48 is provided by pivot pins 52 at essentially the same point as back frame member 20 being coupled to base frame 34. Intermediate rods 102 and 104 intersect and are pin mounted at point 106 on handle rods 94 and 96 in a manner well-known in the art.

Referring now to FIG. 2, there is shown wheeled carrier 10 in a position wherein such is used as a bed-like system. The mechanism for rotating back frame 20 to the position shown in FIG. 2 is through the pivotal coupling of back frame 20 with respect to base frame 34, as has been previously described. Thus, back frame 20 is pivotally coupled to base frame 34 through pivot pins 50 and 52, extending through rear lug members 46 and 48, respectively. In this manner, when U-shaped containment bar member 64 is removed from base frame 34 and back frame 20, back frame 20 is rotatably actuatable to a substantially horizontal position. As is seen in FIG. 2, back frame 20 is able to be rotated to a positional location which is substantially coincident with the horizontal plane formed by the substantially planar base frame 34, due to the fact that the back frame transversely displaced back post members 22 and 24 are pivotally secured to base frame 34.

The overall back frame rotational mechanism includes support leg members 108 and 110, which are pivotally coupled to back post members 22 and 24, respectively. Support leg members 108 and 110 are positionally located adjacent upper post member 26 in order to provide support for back frame 20 when in the position shown in FIG. 2. Thus, support leg members 108 and 110 extend in vertical direction 16 when back frame 20 is positionally located in a substantially horizontal plane parallel with the defined base surface plane 12. The vertical extension of support leg members 108 and 110 is of significance only in the fact that the length extension is calculated to provide a substantially horizontal plane upon which a user may rest when lying on wheeled carrier 10, as is shown in the positional location defined by FIG. 2.

Support leg members 108 and 110 are pivotally coupled to back post members 22 and 24 by pivot pins 112 and 114, respectively. In this manner, support leg members 108 and 110 may be vertically directed, as is shown in FIG. 2, or may be rotated to a position adjacent back post members 22 and 24, as is shown in the phantom line drawing of FIG. 3. This rotational actuation allows wheeled carrier 10 to be used as a stroller without having leg members 108 and 110 extending therefrom when back frame 20 is placed into the substantially vertical position. As in the other structural members forming orthopedic chair 10, leg members 108 and 110 may be formed of a tubular type aluminum, or other lightweight material composition.

Wheeled carrier or orthopedic chair 10 further includes back frame cushion 116 and base frame cushion 118, as is clearly seen in FIGS. 1, 2 and 8. Cushions 116 and 118 may be formed of foam rubber, or some like resilient material, not important to the inventive concept as is herein described, with the exception that such fit adjacent base frame 34 and back frame 20. Additionally, the thickness of back frame cushion 116 and base frame cushion 118 should be such that when wheeled carrier 10 is positionally located, as is shown in FIG. 2, that the upper surfaces of cushions 116 and 118 essentially provide a planar surface for the user. Thus, as can be seen in the illustration of FIG. 2, the thickness of back frame cushion 116 may be slightly less than the thickness of base frame cushion 118, which is set deeper into base frame 34 than cushion 116. Additionally, base frame cushion 118 is formed of a pair of transversely adjacent sections divided by an opening slit 120 upon which base frame cushion 118 may be inserted around second bar member 76. In this manner, base frame cushion 118 may be easily removed or in the alternative, inserted onto wheeled carrier or orthopedic chair 10.

Figure 4:
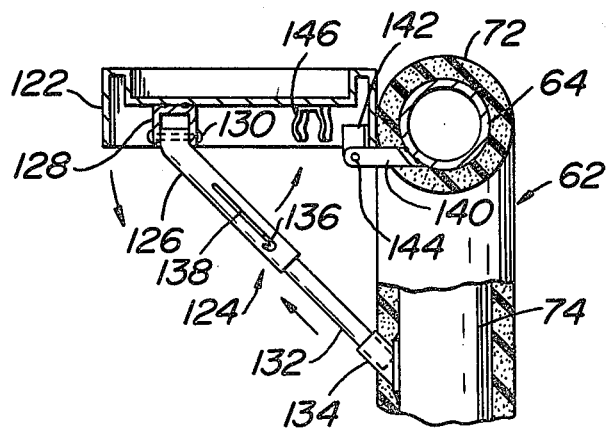
FIG. 4 is a sectional view of the tray member and tray locking mechanism taken along the section lines 4—4 of FIG. 1.
Figure 7:
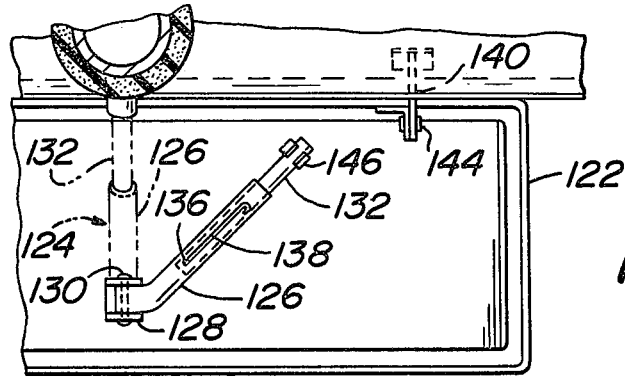
FIG. 7 is a bottom view of the tray member.

Referring now to FIGS. 1, 4 and 7, there is seen tray member 122 which is mounted to a frontal portion of containment mechanism 62. Tray member 122 is pivotally coupled to containment mechanism 62 in order to provide one of two positions. In a first position, tray member 122 is lockingly secured to containment mechanism 62 with tray member 122 passing in a generally horizontal plane, as is shown in FIGS. 1 and 4. Additionally, in a second positional location, tray member 122 is adapted to be pivoted downward in vertical direction 16 adjacent frontal section of containment mechanism 62.

Wheeled carrier or orthopedic chair 10 further includes tray member locking mechanism 124 for lockingly engaging tray member 122 to vertically extending first bar member 74, and U-shaped containment bar member 64.

Tray member locking mechanism 124 includes first tubular tray rod member 126, which is pivotally secured to tray member 122. Tubular tray member 126 is pivotally mounted to U-shaped bracket 128 through first tubular tray rod member pivot pin 130, as is shown in FIG. 4. U-shaped bracket member 128 may be mounted to a lower surface of tray member 122 through welding, bolting, or some like technique not important to the inventive concept, with the exception that U-bracket member 128 is fixedly secured to tray member 122. Second tubular tray rod member 132 is insertable within first tubular tray rod member 126 on a first end thereof, and is further releasably insertable within insert 134 formed on vertically extending first bar member 74 on a second end thereof. Thus, second tubular tray rod member 132 is slidably insertable within both insert member 134 and first tubular tray rod member 126.

Additionally, second tubular tray rod member 132 has rod member pin 136 extending therefrom and further extending external the diameter of first tubular tray rod member 126. First tubular tray rod member 126 includes J-shaped slot 138 formed in a sidewall thereof, as is shown in FIGS. 4 and 7. J-shaped slot 138 has a width of sufficient size in order that second tray rod member pin 136 extends therethrough and is slidably movable therein. As is seen in the locking position of FIG. 4, pin 136 is at a lower point of J-shaped slot 138, and is engaged at one end thereof to prevent movement of tray 122 in a downward position. As can be seen in FIG. 4, second tubular tray rod member 132 has also been inserted within insert member 134 to maintain tray member 122 in a horizontal plane.

In order to full constrain tray member 122 in the horizontal plane, tray rod 140, as shown in FIG. 4, is fixedly secured to U-shaped containment bar member 64 through welding, bolting, or some like technique. Second tray bar member 142 is mounted in secured fashion to tray member 122 once again through welding, bolting, or some like technique. Tray bar member 140 and second tray bar member 142 are coupled each to the other by pivot pin 144 which allows tray member 122 to be rotated to a vertical position when second tubular tray rod member 132 is moved upward in J-shaped slot 138 and removed from insert 134.

Clasp member 146 is mounted to a lower surface of tray member 122 in fixed securement thereto through welding, or bolting, as has previously been described for other elements of wheeled carrier 10. Clasp member 146 is used as is shown in FIG. 7 for releasably securing second tubular tray rod member 132 to tray member 122 when tray member 122 is allowed to remain in the vertical position. Clasp member 146 is generally U-shaped in contour, and springingly grasps second tubular tray rod member 132 as is shown in FIG. 7 when rod member 132 is mounted therein. Additionally, it is understood that the rotation of tray member locking mechanism 124 about first tubular tray rod member pivot pin 130 results in a skewed type arc and thus, clasp member 146 is angularly mounted with respect to longitudinal direction 18 in order to grasp second tubular tray rod member 132 in the stored position.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended claims.

What is claimed is:
1. A wheeled carrier comprising:
 (a) a substantially planar back frame extending in a substantially vertical plane having a pair of transversely displaced back post members;
 (b) a substantially planar base frame coupled to said back frame extending in a substantially horizontal plane;
 (c) means for rotating said back frame to a positional location substantially coincident with said horizontal plane formed by said substantially planar base frame, said back frame transversely displaced back post members being pivotally secured to said base frame;

(d) a plurality of wheel members rotatably coupled to said base frame for rolling said wheeled carrier on a base surface; and, (e) containment means being independently releasably coupled to each of said back and base frames for preventing a user from falling external said wheeled carrier, said containment means being (1) vertically adjustable with respect to said base and back frames, and (2) removable from each of said back and base frames, whereby said containment means maintains said back frame in said substantially vertical plane when said containment means is coupled to said back frame.

2. The wheeled carrier as recited in claim 1 where said containment means includes:

(a) a substantially U-shaped containment bar member releasably coupled to said transversely displaced back post members of said back frame;

(b) a substantially vertically extending first bar member fixedly secured to said U-shaped containment bar member; and, (c) a substantially vertical extending second bar member releasably secured to said base frame, said second bar member being slidably received within said first bar member.

3. The wheeled carrier as recited in claim 2 including means for vertically adjusting said U-shaped containment bar member at predetermined vertical displacements above said base frame.

4. The wheeled carrier as recited in claim 3 where said vertical adjustment means includes a first pin member insertable through a plurality of first bar member openings and second bar member openings, said openings in said first bar member and second bar member being vertically displaced within said respectively first and second bar members, said openings formed within said first and second bar members being adapted to be aligned each with respect to the other in said vertical direction.

5. The wheeled carrier as recited in claim 3 where said vertical adjustment means includes at least a second pin member insertable through at least on through opening of said U-shaped containment bar member, said second pin member being insertable within a plurality of vertically displaced openings formed within at least one of said pair of transversely displaced back post members of said back frame.

6. The wheeled carrier as recited in claim 2 including a tray member mounted to a frontal portion of said containment means, said tray member pivotally coupled to said containment means (1) in lockingly secured relation to said containment means, said tray member extending in said substantially horizontal plane, and (2) in pivotally secured relation to said containment means, said tray member extending in said substantially vertical plane.

7. The wheeled carrier as recited in claim 6 including means for lockingly engaging said tray member to said vertically extending first bar member and said U-shaped containment bar member.

8. The wheeled carrier as recited in claim 7 where said tray member locking engagement means includes:

(a) a first tubular tray rod member pivotally secured to said tray member; and, (b) a second tubular tray rod member insertable (1) within said first tubular tray rod member on a first end thereof, and, (2) within an insert formed on said vertically extending first bar member on a second end thereof, said second tubular tray rod member being releasably constrained to said first tubular tray rod member at a predetermined positional location.

9. The wheeled carrier as recited in claim 2 where said vertically extending second bar member is threadedly secured to said base frame to provide removable securement of said vertically extending second bar member to said base frame.

10. The wheeled carrier as recited in claim 9 including a bolt member fixedly secured to said base frame, said bolt member having an external thread, said vertically extending second bar member having an internal thread adapted for threaded securement to said bolt member external thread.

11. The wheeled carrier as recited in claim 1 where said back frame rotational means includes means for supporting said back frame in said substantially horizontal plane.

12. The wheeled carrier as recited in claim 11 where said back frame support means includes at least one support leg member extending in said vertical direction when said back frame is positionally located in said substantially horizontal plane, said support leg member extending from said back frame to said base surface.

13. The wheeled carrier as recited in claim 12 where said support leg member is pivotally coupled to said back frame member.

* * * * *